March 25, 1969     F. W. LAWRENCE     3,434,262
BLIND FASTENER FOR SANDWICH PANEL AND METHOD
Filed Sept. 8, 1967

INVENTOR.
FRANK W. LAWRENCE
BY Watts, Hoffmann, Fisher & Heinke
ATTORNEYS.

United States Patent Office 3,434,262
Patented Mar. 25, 1969

3,434,262
BLIND FASTENER FOR SANDWICH PANEL
AND METHOD
Frank W. Lawrence, Mentor, Ohio, assignor to The National Screw & Manufacturing Company, Cleveland, Ohio, a corporation of Ohio
Filed Sept. 8, 1967, Ser. No. 666,345
Int. Cl. E04b 2/28; E04c 2/34; E06b 3/54
U.S. Cl. 52—617                          8 Claims

ABSTRACT OF THE DISCLOSURE

A method of and/or fastener for securing together or assembling a so-called sandwich-type member comprising facing members separated by a core member, for example, so-called honeycomb structural material, and a supporting or supported member where one side of the assembly is blind, that is, not accessible to the operator, and an assembly comprising such a member and a support or supporting member.

The present invention relates to the attaching of a sandwich-type member to a support or vice versa, and to fasteners for effecting such attachments.

So-called sandwich-type members comprising a relatively light or low density core member interposed between and separating facing sheet-like members, preferably fixed to the core member at their contacting areas, is difficult to attach or secure to a support or vice versa with conventional fasteners because of the inability of the sandwich-type member to withstand pressures to which it is subject incident to the use of such fasteners, either of the threaded or nonthreaded type, particularly when one side of the assembly is blind, that is, nonaccessible to the operator.

United States patent to Rodgers, Jr., No. 3,078,002, issued Feb. 19, 1963, to North American Aviation, Inc., is illustrative of what is believed to be representative of prior art structures of the character here involved.

The invention provides a novel and improved structural or like assembly including a plurality of members at least one of which is a sandwich-type member comprising facing members separated by a core member and having aligned apertures of different size in the facing members secured together by a screw-type blind fastener comprising a screw having a threaded shank and a head inserted through from the side thereof having the larger aperture therein threaded onto the shank of the screw with a portion thereof projecting therefrom and having a body portion provided with a head at the end remote from the head of the screw insertable through the larger of the apertures and having its bearing face abutting the inner side of the facing member having the smaller aperture therein and a frusto-conical end portion projecting from the other side of the sheet, and a blind head member comprising a malleable sleeve interposed between the head of the screw and the side of the structural members adjacent thereto with the end of the blind head member overlying the frusto-conical end of the nut member and expanded thereby.

The invention further provides a novel and improved screw-type blind fastener, especially designed for use in the aerospace industries for securing together or assembling together structural members one of which is a sandwich-type structural member, comprising facing members separated by a relatively light core member, preferably so-called honeycomb material, and the other a supported or supporting member where one side of the assembly is blind and which fastener will be relatively inexpensive to produce and will fixedly hold the parts secured together thereby.

The invention further provides a novel and improved method of securing together members one of which is a sandwich-type member having spaced sheets separated by a core by means of a fastener comprising a headed screw, a nut having a head at one end of a cylindrical body and a frusto-conical portion at the other end threaded onto the screw with the head of the nut remote from the head of the screw and a malleable sleeve interposed between the head of the screw and the nut which comprises forming aligned apertures in the sheets of the sandwich-type member one of which apertures is of such a size that the head of the screw and the body of the nut will just pass therethrough and the other of which is such that the head of the nut will pass therethrough, providing the other of said members with an aperture, assembling the members with the apertures aligned, inserting the fastener screw head first through the apertures in the members with the screw head passing through the larger of the apertures in the sandwich-type member before it passes through the smaller aperture therein effecting relative rotation between the screw and nut to force the malleable sleeve over the frusto-conical portion of the nut and thus expand the same into a blind head in engagement with the side of the members adjacent thereto and subsequently applying a second nut to the threaded end of the shank of the screw projecting from the head of the nut.

The invention resides in certain constructions and arrangement of parts which will be hereinafter referred to in connection with the following description of the preferred embodiment described with reference to the accompanying drawings forming a part of this specification in which similar reference characters designate corresponding parts, and in which.

Figure 1:
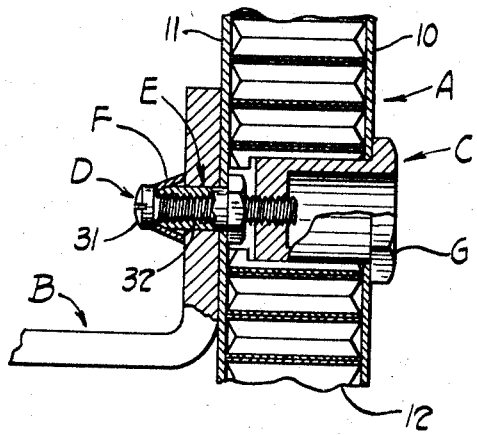
FIG. 1 is a sectional view with portions in elevation of a structural assembly embodying the present invention.

The assembly shown in FIG. 1 includes the structural members A and B secured together by a fastener C. The member A is a sandwich-type member of the so-called honeycomb construction and comprises facing plate or sheet-like members 10 and 11 separated by a core member 12 to opposite sides of which the facing members are fixed. The facing members 10 and 11 have aligned circular apertures 15 and 16 respectively which in turn align with a stepped aperture 17 in the core 12. The right-hand portion 20 of the aperture 17, as viewed in the drawings, is of the same diameter as the aperture 15 with which it is contiguous and the left-hand portion 21 is of slightly smaller diameter than the right-hand portion. The aperture 17 could be of the same diameter throughout, in which event the diameter would preferably be the same as that of the aperture 15 in the facing member 10.

In the embodiment shown in FIG. 1, the structural member B has an aperture 25 therethrough which aperture is of the same diameter as the aperture 16 in the facing member 11 adjacent thereto and with which aperture it is aligned.

The fastener C, which is of the blind type, comprises four parts, a circular-headed screw D, a nut E threaded onto the shank 30 of the screw D, a sleeve-like blind head member F interposed between the bearing face of the head 31 of the screw D and the blind side of the members A and B and having its righthand end expanded over a tapered end 32 of a nut E having a cylindrical body portion 33 and a head 34, and a second nut G threaded onto the end of the threaded shank 30 of the screw D projecting to the right, that is, the accessible side of the assembly, through the nut E. The head 36 of the nut G engages this exposed or accessible side of the plate 10 of the member A. The plate 10 of the member A and the member B are secured together by being clamped between the blind heads F and 34 of the nut E and the head 36 of the nut G reinforces the assembly.

Figure 2:
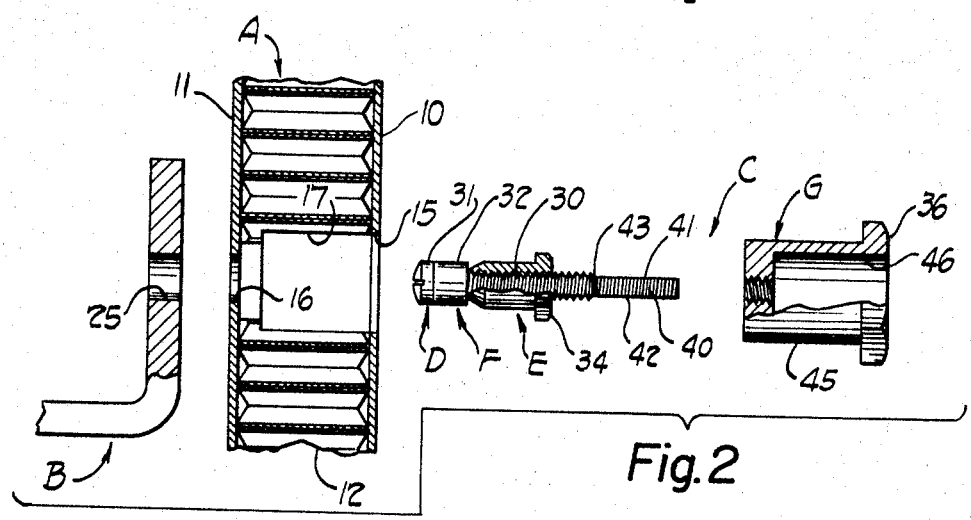
FIG. 2 is an exploded view of the parts shown in FIG. 1.

In the exploded view, FIG. 2, the screw D and the blind head F are shown in their predriven condition. The maximum diameter of the head 31 of the screw D, the body portion 33 of the nut E and the undriven blind head member or sleeve F are all substantially the same and preferably approximately one and one-half time the effective diameter of the shank 30 of the screw D, and the diameter of the apertures 16 and 25 in the face plate 11 of the member A and the member B, respectively, are such that the assembled screw, nut and sleeve parts D, E and F can be inserted therein or therethrough without undue looseness therein. The lengths of the body portion 33 of the nut E is such that when the parts of the fastener, referred to, are assembled and inserted through the apertures 16 and 26, the tapered or frusto-conical end or nose portion 32 of the nut E is located either wholly or substantially so to the left or nonaccessible side of the assembled members A and B, that is, at the left side of the member B, as shown in FIG. 1 of the drawings.

The right-hand end of the shank 30 of the screw D is provided with a suitable driving connection as is the head 34 of the nut E so that the screw D can be rotated relative to the nut E to draw the sleeve F over the tapered end 32 of the nut D and form it into a blind head at the nonaccessible side of the assembled members A and B.

In the embodiment shown, the driving connection for the screw D is in the form of an extension of or a projection on the end of the shank 30 of the screw D. The projection 40 is provided with two opposite flat sides 41 and 42 and is adapted to be engaged or received in a suitable, complementary aperture in a driving tool. The head 34 of the nut E is provided with slots adapted to be engaged by a suitable tool to hold the same stationary while the screw B is rotated. The driving slots in the head 34 may be omitted if desired and the fastener driven with a driver not requiring driving connections on the nut part. The shank of the screw D adjacent to the inner ends of the flat sides 41 and 42 is characterized by a V-shaped groove 43 which leaves a notched and weakened section of predetermined area less than that of any other part of the screw D. When the fastener is driven, the screw D is rotated until the flattened end portion 40 breaks away from the shank proper at the notched section. This assures tightening or driving of the fastener to a predetermined stress or load.

The nut G, in addition to the head 36, comprises a tubular body portion 45 counterbored from the right-hand or accessible side as at 46 to reduce the weight thereof. The length of the tubular body portion 45 of the nut G is such that it can be threaded onto the end of the shank 30 of the screw D projecting from the head of the nut E until the bearing face of the head 36 of the nut tightly engages the exterior or accessible side of the member A. The body portion 45 of the nut G is of relatively large diameter to provide a relatively large head 36 for the nut for the purpose of obtaining a good bearing against the exposed side of the member A even though it is of honeycomb construction.

Figure 3:
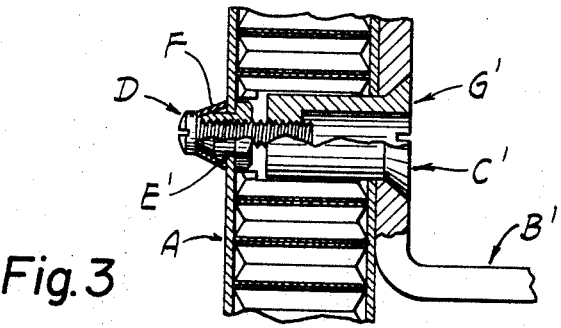
FIGS. 3, 4 and 5 are views similar to FIG. 1 but showing modified constructions.

The structural assembly shown in FIG. 3 is similar to that shown in FIG. 1, and will not be described in detail. The parts of the assembly shown in FIG. 3 which are duplicates of those shown in FIG. 1 are designated by the same reference characters and the corresponding, but slightly modified parts, are designated by the same reference characters with a prime mark applied thereto. In FIG. 3 the relative positions of the members A and B' are reversed, that is, the member B' is located at the right-hand side of the member A, the head 36' of the nut G', which head corresponds with the head 36 of the nut G, is of the countersunk type and the aperture 25' in the member B' is counterbored so that the head 36' will be flush with the right-hand surface of the member B'. The length of the shank of the screw D', and the length of the body portion of the nut E are both reduced to correspond with the reduction in required grip length effected by removal of the member B' to the right-hand side of the member A. A corresponding increase in the length of the body portion of the nut G will be noted.

With the construction shown in FIG. 1, the nut G may be omitted. In such event the length of the shank of the screw D may be reduced. In other words, the break off groove in the screw D may be closer to the head, for any given grip requirement, than would otherwise be the case. In fact, it may be so located as to eliminate or avoid any projection of the shank of the screw to the right of the nut E subsequent to driving.

Figure 4:
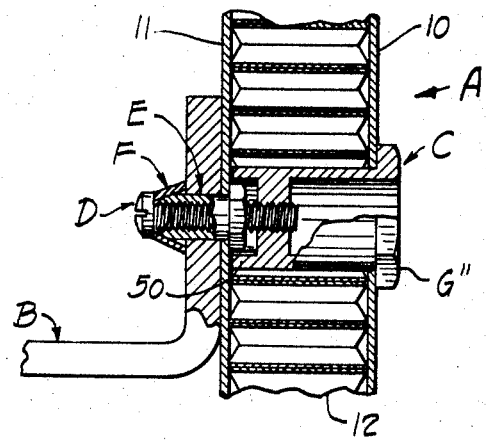
Figure 5:
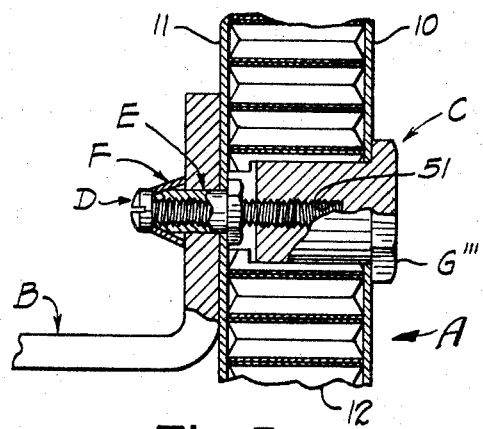

The assemblies shown in FIGS. 4 and 5 are similar to that shown in FIG. 1 with the exception of the nuts G" and G"' corresponding to the nut G and the depth of the hole or aperture in the honeycomb member A which receives the nut G". The members and/or parts of the assemblies shown in FIGS. 4 and 5, which are duplicates of those shown in FIG. 1, are designated by the same reference characters and will not be described.

The nut G" shown in FIG. 4 is similar to the nut G of FIG. 1 except that it has an annular flange 50 at its blind end which extends to or adjacent to the nonblind side of the sheet 11.

The nut G"' shown in FIG. 5 is similar to the nut G shown in FIG. 1 except that it is not counterbored as is the nut G at 46 and the threaded aperture 51 which receives the shank 30 of the screw D is blind, terminating short of the nonblind end of the nut.

From the foregoing it is believed that it will be apparent that the objects and advantages of the invention heretofore enumerated and others have been accomplished and that there has been provided a novel and improved assembly comprising a plurality of parts one of which is of sandwich-type construction secured together by a blind-type fastener. It is further believed that it will be apparent that a new method of and fastener for securing together structural assemblies one of which is of the sandwich-type have been provided.

While four preferred embodiments of the invention have been illustrated and described, the invention is not limited to the particular constructions shown, for example, the parts D, E and F of the fastener C may be constructed in all respects similar to the fastener shown in Patent No. 3,307,444, with the exception of the relative length of the shank of the screw which is appreciably longer in the present invention than the corresponding shank of the screw disclosed in said application.

It is applicant's intention to herein cover all adaptations, modifications and uses of the invention herein disclosed which come within the practice of those skilled in the art to which the invention relates and the spirit and scope of the appended claims.

Having thus described my invention, what I claim is:

1. In combination a structural assembly accessible from one side and comprising: a sandwich-type structural member having spaced sheets provided with aligned apertures one of which is smaller than the other; a second structural member abutting said sandwich-type structural member and having an aperture aligned with said apertures in said sandwich-type structural member; a fastener securing said structural members together and comprising: a screw member including a threaded shank portion projecting through said smaller of said aligned apertures; a circular head at one end of said shank portion, formed integral therewith and located at the nonaccessible side of said structural members; a nut member including an internally threaded cylindrical tubular body portion threaded onto said shank portion of said screw member and having an outside diameter substantially equal to the diameter of said circular head of said screw member; a head formed integral with the end of said tubular body portion of said nut member remote from said circular head of said screw member insertable through the larger of said apertures and having its bearing face abutting the accessible side of said sheet having said smaller of said apertures; a frusto-conical end portion formed integral with said tubular body portion of said nut member and projecting from the non-accessible side of said structural members; and a blind head member comprising a malleable sleeve interposed between said circular head of said screw member and the nonaccessible side of said structural members with the end of said blind head member over-lying said frusto-conical end portion of said nut member and expanded thereby.

2. In combination a structural assembly accessible from one side and comprising: a sandwich-type structural member having spaced sheets provided with aligned apertures one of which is smaller than the other; a second structural member abutting said sandwich-type structural member and having an aperture aligned with said apertures in said sandwich-type structural member; a fastener securing said structural members together and comprising: a screw member including a threaded shank portion projecting through said smaller of said aligned apertures; a circular head of smaller diameter than the diameter of the smaller of said apertures in said sandwich-type member at one end of said shank portion, formed integral therewith and located at the nonaccessible side of said structural members; a nut member including an internally threaded cylindrical tubular body portion threaded onto said shank portion of said screw member and having an outside diameter substantially equal to the diameter of said circular head of said screw member; a head formed integral with the end of said tubular body portion of said nut member remote from said circular head of said screw member insertable through the larger of said apertures having its bearing face abutting the accessible side of said sheet having said smaller of said apertures and having said threaded shank portion of said screw member projecting therethrough; a frusto-conical camming portion formed integral with said tubular body portion of said nut member and projecting from the nonaccessible side of said structural members with the end of said blind head member a malleable sleeve interposed between said circular head of said screw member and the nonaccessible side of said structural member with the end of said blind head member adjacent to the nonaccessible side of said structural members overlying said frusto-conical camming portion of said nut member and being outwardly deformed thereby and cooperating with said circular head of said screw member to secure said structural members together.

3. In combination a structural assembly accessible from one side and comprising: a sandwich-type structural member having spaced sheets provided with aligned apertures one of which is smaller than the other; a second structural member abutting said saidwich-type structural member and having an aperture aligned with said apertures in said sandwich-type structural member; a fastener securing said structural members together and comprising: a screw member including a threaded shank portion projecting through said smaller of said apertures; a circular head of smaller diameter than the diameter of the smaller of said apertures in said sandwich-type member at one end of said portion formed integral therewith and located at the nonaccessible side of said structural member; a first nut member including an internally threaded cylindrical tubular body portion threaded onto said shank portion of said screw member and having an outside diameter substantially equal to the diameter of said circular head of said screw member; a head formed integral with the end of said tubular body of said first nut member remote from said circular head of said screw member insertable through the larger of said apertures, having its bearing face abutting the side of said sheet having said smaller of said apertures facing the accessible side of said assembly, and having said threaded shank portion of said screw member projecting therethrough; a frusto-conical end portion formed integral with said tubular body portion of said first nut member and projecting from the nonaccessible side of said structural members; a blind head member comprising a malleable sleeve interposed between said circular head of said screw member and the nonaccessible side of said structural members, the end of said blind head member overlying said frusto-conical end portion of said first nut member and expanded thereby; and a second nut member having an internally threaded cylindrical tubular body portion threaded onto the end of said shank portion of said screw member projecting from the head of said first nut member toward the accessible side of said assembly and a head portion formed integral with said tubular body portion of said second nut member and located at the accessible side of said structural members.

4. A fastener for securing together structural members accessible from one side and one of which is a sandwich-type member having spaced sheets provided with aligned apertures one of which is larger than the other and another of which is a member abutting said sandwich-type member and has an aperture aligned with said apertures in said sandwich-type member, said fastener comprising: a screw member including a threaded shank portion adapted to project through the smaller of said apertures; a circular head at one end of said shank portion formed integral therewith and adapted to be projected through the smaller of the apertures in the sandwich-type member and located at the nonaccessible side of said structural members; a nut member including an internally threaded cylindrical tubular body portion threaded onto said shank portion of said screw member and having an outside diameter substantially equal to the diameter of said circular head of said screw member; a head formed integral with the end of said tubular body portion of said nut member remote from said circular head of said screw member and being larger than said circular head of said screw member; a frusto-conical end portion formed integral with said tubular body portion of said nut member; a blind head member comprising a malleable sleeve interposed between said circular head of said screw member and said frusto-conical end portion of said nut member; a threaded driving connection portion at the end of said shank portion of said screw member opposite to said circular head portion; and a shear portion having less strength than the strength of said driving connection portion and said shank portion connecting said driving connection portion of said shank portion and being spaced from said cylindrical head portion of said screw member and said frusto-conical end portion length of said nut member and said blind head member.

5. A fastener for securing together structural members accessible from one side and one of which is a sandwich-type member having spaced sheets provided with aligned apertures one of which is larger than the other and another of which is a member abutting said sandwich-type member and has an aperture aligned with said apertures in said sandwich-type member, said fastener comprising: a screw member including a threaded shank portion adapted to project through the smaller of said apertures; a circular head at one end of said shank portion formed integral therewith and adapted to be projected through the smaller of the apertures in the sandwich-type member and located at the nonaccessible side of said structural members; a first nut member including an internally threaded cylindrical tubular body portion threaded onto said shank portion of said screw member and having an outside diameter substantially equal to the diameter of said circular head of said screw member; a head formed integral with the end of said tubular body portion of said first nut member remote from said circular head of said screw member and being larger than said circular head of said screw member; a frusto-conical end portion formed integral with said tubular body portion of said first nut member; a blind head member comprising a malleable sleeve interposed between said circular head necting said driving connection portion to said shank portion of said nut member; a threaded driving connection portion at the end of said shank portion of said screw member opposite to said circular head portion; a shear portion having less strength than the strength of said driving connection portion and said shank portion connecting said driving conection portion to said shank portion and being spaced from said cylindrical head portion of said screw member a distance at least as great as the length of said first nut member and said blind head member; a second nut member having an internally threaded cylindrical tubular body portion threaded onto one of said shank and driving portions of said screw member; a head portion at the end of said tubular body portion of said second nut member adjacent to the end thereof remote from said first nut member; said circular head portion of said screw member having a diameter only slightly smaller than the diameter of the smaller of the apertures in the sandwich-type member; said head of said first nut member being larger than the smaller of the apertures but smaller than the larger of the apertures in the sandwich-type member; and said head of said second nut member being larger than the larger of said apertures in the sandwich-type member.

6. A fastener for securing together structural members accessible from one side and one of which is a sandwich-type member having spaced sheets provided with aligned apertures one of which is larger than the other and another of which is a member abutting said sandwich-type member and has an aperture aligned with said apertures in said sandwich-type member, said fastener comprising: a screw member including a threaded shank portion adapted to project through the smaller of said apertures; a circular head at one end of said shank portion formed integral therewith and adapted to be projected through the smaller of the apertures in the sandwich-type member and located at the nonaccessible side of said structural members; a first nut member including an internally threaded cylindrical tubular body portion threaded onto said shank portion of said screw member and having an outside diameter substantially equal to the diameter of said circular head of said screw member; a head formed integral with the end of said tubular body portion of said first nut member remote from said circular head of said screw member and being larger than said circular head of said screw member; a frusto-conical end portion formed integral with said tubular body portion of said first nut member; a blind head member comprising a malleable sleeve interposed between said circular head of said screw member and said frusto-conical end portion of said first nut member; a threaded driving connection portion at the end of said shank portion of said screw member opposite to said circular head portion; a shear portion having less strength than the strength of said driving connection portion and said shank portion connecting said driving connection portion to said shank portion and being spaced from said cylindrical head portion of said screw member a distance at least as great as the length of said first nut member and said blind head member; a second nut member having an internally threaded cylindrical tubular body portion, counterbored from the accessible end thereof, threaded onto one of said shank and driving portions of said screw member; a head portion at the end of said tubular body portion of said second nut member adjacent to the end thereof remote from said first nut member; said circular head portion of said screw member having a diameter only slightly smaller than the diameter of the smaller of the apertures in the sandwich-type member; said head of said first nut member being larger than the smaller of the apertures but smaller than than the larger of the apertures in the sandwich-type member; and said head of said second nut member being larger than the larger of said apertures in the sandwich-type member.

7. The method of securing together members one of which is a sandwich-type member having spaced sheets separated by a core by a fastener comprising a headed screw, a nut having a head at one end of a cylindrical body and a frusto-conical portion at the other end threaded onto the screw with the head of the nut remote from the head of the screw, and a malleable sleeve interposed between the head of the screw and the nut which method comprises: providing aligned apertures in the sheets of the sandwich-type member one of which apertures is at least as large as the head of the screw and the body of the nut and the other at least as large as the head of the nut; providing the other of said members with an aperture; assemblying said members with the apertures aligned; inserting said fastener, screw head first through the apertures in the members with the screw head passing through the larger of the apertures in said sandwich-type member before it passes through the smaller aperture therein; and effecting relative rotation between the screw and the nut to set the fastener.

8. The method of securing together members one of which is a sandwich-type member having spaced sheets separated by a core by a fastener comprising a headed screw, a first nut having a head at one end of a cylindrical body and a frusto-conical portion at the other end threaded onto the screw with the head of the nut remote from the head of the screw, a malleable sleeve interposed between the head of the screw and the nut, and a second headed nut threaded onto the end of the screw projecting from the first nut which method comprises: providing aligned apertures in the sheets of the sandwich-type member one of which apertures is at least as large as the head of the screw and the body of the nut and the other at least as large as the head of the nut; providing the other of said members with an aperture; assemblying said members with the apertures aligned; inserting said fastener, screw head first through the apertures in the members with the screw head passing through the larger of the apertures in said sandwich-type member before it passes through the smaller aperture therein; effecting relative rotation between the screw and the first nut to expand the malleable sleeve into a head at one side of the members; and applying the second nut to the end of the screw projecting from the first nut.

References Cited

UNITED STATES PATENTS

| | | | |
|---|---|---|---|
| 2,585,557 | 2/1952 | Kreimendahl | 52—617 |
| 3,078,002 | 2/1963 | Rodgers | 52—617 |
| 3,173,520 | 3/1965 | Fisher | 52—617 X |
| 3,252,493 | 5/1966 | Smith | 151—41.7 |
| 3,307,444 | 3/1967 | Money | 85—74 |
| 3,324,618 | 6/1967 | Blickle | 52—489 |

ALFRED C. PERHAM, *Primary Examiner.*

PRICE C. FAW, JR., *Assistant Examiner.*

U.S. Cl. X.R.

29—455, 526; 52—438, 483, 506; 85—74